United States Patent
Miura

(10) Patent No.: US 11,261,311 B2
(45) Date of Patent: Mar. 1, 2022

(54) RUBBER COMPOSITION AND METHOD FOR PRODUCING SAME

(71) Applicant: TOYO TIRE CORPORATION, Itami (JP)

(72) Inventor: Souichiro Miura, Itami (JP)

(73) Assignee: TOYO TIRE CORPORATION, Itami (JP)

(*) Notice: Subject to any disclaimer, the term of this patent is extended or adjusted under 35 U.S.C. 154(b) by 496 days.

(21) Appl. No.: 16/323,333

(22) PCT Filed: Jun. 5, 2017

(86) PCT No.: PCT/JP2017/020823
§ 371 (c)(1),
(2) Date: Feb. 5, 2019

(87) PCT Pub. No.: WO2018/096715
PCT Pub. Date: May 31, 2018

(65) Prior Publication Data
US 2021/0292517 A1    Sep. 23, 2021

(30) Foreign Application Priority Data

Nov. 22, 2016 (JP) .............................. JP2016-226535

(51) Int. Cl.
| | |
|---|---|
| *C08L 7/00* | (2006.01) |
| *C08L 9/00* | (2006.01) |
| *C08L 21/00* | (2006.01) |
| *C08L 7/02* | (2006.01) |
| *C08J 3/21* | (2006.01) |
| *C08J 3/22* | (2006.01) |
| *C08K 3/04* | (2006.01) |
| *C08L 21/02* | (2006.01) |

(52) U.S. Cl.
CPC ................. *C08L 7/02* (2013.01); *C08J 3/212* (2013.01); *C08J 3/226* (2013.01); *C08K 3/04* (2013.01); *C08L 21/02* (2013.01)

(58) Field of Classification Search
CPC .... C08L 7/02; C08L 21/02; C08L 9/02; C08L 7/00; C08L 21/00; C08L 9/00; C08J 3/226; C08J 3/212; C08J 3/22; C08K 3/04; B60C 1/0008
USPC ...................................................... 523/351
See application file for complete search history.

(56) References Cited

U.S. PATENT DOCUMENTS

| | | | | |
|---|---|---|---|---|
| 10,066,091 | B2 * | 9/2018 | Miura | C08L 7/00 |
| 2014/0255654 | A1 * | 9/2014 | Meza | C08L 9/00 |
| | | | | 428/168 |
| 2017/0137582 | A1 | 5/2017 | Nomura et al. | |

FOREIGN PATENT DOCUMENTS

| | | |
|---|---|---|
| JP | 6-287356 A | 10/1994 |
| JP | 2005-220187 A | 8/2005 |
| JP | 2006-169483 A | 6/2006 |
| JP | 2006-225599 A | 8/2006 |
| JP | 2007-203903 A | 8/2007 |
| JP | 2007-224067 A | 9/2007 |
| JP | 2016-35030 A | 3/2016 |
| WO | 2011/145586 A1 | 11/2011 |

OTHER PUBLICATIONS

Search Report dated Jul. 27, 2020 issued in counterpart German Patent Application No. 11 2017 005 906.2, with English Translation. (7 pages).
Notification of Transmittal of Translation of the International Preliminary Report on Patentability (Form PCT/IB/338) issued in counterpart International Application No. PCT/JP2017/020823 dated Jun. 6, 2019, with Forms PCT/IB/373 and PCT/ISA/237. (6 pages).
Office Action dated May 26, 2020, issued in counterpart JP Application No. 2016-226535, with English translation (4 pages).
Office Action dated Apr. 8, 2021, issued in counterpart CN Application No. 201780063829.8, with English translation. (11 pages).
International Search Report dated Aug. 29, 2017, issued in counterpart International Application No. PCT/JP2017/020823 (2 pages).

* cited by examiner

*Primary Examiner* — Hannah J Pak
(74) *Attorney, Agent, or Firm* — Westerman, Hattori, Daniels & Adrian, LLP

(57) ABSTRACT

This rubber composition comprises a rubber wet master batch which uses a rubber latex solution and a carbon black (A)-containing slurry as raw materials, rubber, and carbon black (B), wherein the amount of the carbon black (A) in the rubber wet master batch is 1 to 35 parts by weight with respect to 100 parts by weight of the rubber component in the rubber wet master batch, and the total amount of the carbon black (A) and (B) in the rubber composition is 50 parts by weight or more with respect to 100 parts by weight of the total rubber component in the rubber composition. Accordingly, the present invention can provide: a rubber composition from which vulcanized rubber having excellent low heat generating properties and wear resistance can be obtained; and a method for producing the rubber composition.

4 Claims, No Drawings

RUBBER COMPOSITION AND METHOD FOR PRODUCING SAME

TECHNICAL FIELD

The present invention relates to a rubber composition, and a method for producing the composition.

BACKGROUND ART

It has been hitherto known in the rubber industry that when a rubber composition containing carbon black is produced, a wet rubber masterbatch is used to improve the workability of the composition and the dispersibility of carbon black therein. This technique is a technique of mixing carbon black and a dispersing solvent beforehand with each other at a predetermined ratio, dispersing carbon black into the dispersing solvent by a mechanical force, mixing the resultant carbon-black-containing slurry solution with a rubber latex solution in a liquid phase, adding a solidifier such as an acid, after the mixing, to the mixture to solidify the mixture, collecting the solidified mixture, and then drying the mixture.

It is known that the use of a wet rubber masterbatch gives a rubber composition better in rubber physical properties, such as abrasion resistance and low exothermicity, than the use of a dry rubber masterbatch yielded by mixing carbon black and rubber with each other in a solid phase since in the case of the former use, carbon black is excellent in dispersibility (Patent Documents 1 to 4).

PRIOR ART DOCUMENTS

Patent Documents

Patent Document 1: JP-A-2007-224067
Patent Document 2: JP-A-2007-203903
Patent Document 3: JP-A-2006-225599
Patent Document 4: JP-A-2006-169483

SUMMARY OF THE INVENTION

Problems to be Solved by the Invention

Apart from the above, in the market, about rubber products (vulcanized rubbers) each yielded using a rubber composition as a raw material, in particular, about tread rubbers for tires for light trucks, rubbers having a lower exothermicity, and an abrasion resistance are desired. However, vulcanized rubbers yielded, respectively, from rubber compositions as described in the above-mentioned patent documents do not satisfy these properties.

In the light of the above-mentioned actual situation, the present invention has been made. An object thereof is to provide a rubber composition from which a vulcanized rubber excellent in low exothermicity and abrasion resistance can be yielded; and a method for producing the rubber composition.

Means for Solving the Problems

The present invention relates to a rubber composition including a wet rubber masterbatch using, as raw materials, a rubber latex solution and a slurry containing a carbon black (A); a rubber; and a carbon black (B); an amount of the carbon black (A) in the wet rubber masterbatch being from 1 to 35 by weight for 100 parts by weight of a rubber component in the wet rubber masterbatch; and a total amount of the carbon blacks (A) and (B) in the rubber composition being 50 parts or more by weight for 100 parts by weight of all rubber components in the rubber composition.

The present invention also relates to a method for producing the above-defined rubber composition including: a step (i) of mixing the rubber latex solution with the slurry solution containing the carbon black (A) to produce a rubber latex solution containing the carbon black (A); a step (ii) of solidifying and drying the resultant rubber latex solution containing the carbon black (A) to produce a wet rubber masterbatch; and a step (iii) of adding the rubber and the carbon black (B) further into the resultant wet rubber masterbatch, and dry-mixing these components with each other.

Effect of the Invention

The rubber composition of the present invention is a composition including a wet rubber masterbatch containing a specified amount (low filling amount) of a carbon black (A), a rubber, and a carbon black (B); and is a composition in which the total of the carbon blacks (A) and (B) is included in a predetermined amount or more. It is presumed that by rendering the present invention this composition, the carbon black (B) in the rubber composition is unevenly distributed in (a layer of) the rubber added separately from (a layer of) the rubber in the wet rubber masterbatch since the amount of the carbon black (A) filled into the wet rubber masterbatch is low. Thus, it is presumed that the carbon blacks (A) and (B) can be evenly dispersed in the whole of the rubber components (rubber matrix) in the rubber composition, so that a vulcanized rubber yielded from the rubber composition is improved in low exothermicity and in abrasion resistance.

It is also presumed that when the carbon blacks (A) and (B) are used which each have a specified DBP absorption amount (dibutyl phthalate absorption amount) and a specified iodine adsorption amount, an increase is made in the amount of a bound rubber of the carbon blacks and the rubber components in the rubber composition, so that the vulcanized rubber, which is yielded from the rubber composition, is further improved in abrasion resistance.

MODE FOR CARRYING OUT THE INVENTION

<Rubber Composition>

The rubber composition of the present invention includes a wet rubber masterbatch using, as raw materials, a rubber latex solution and a slurry containing a carbon black (A); a rubber; and a carbon black (B). An appropriate combination of two or more of various blending agents may be incorporated into the rubber composition.

<Wet Rubber Masterbatch>

The wet rubber masterbatch is a masterbatch yielded by mixing the rubber latex solution with the slurry containing the carbon black (A) in a liquid phase and further drying the mixture.

As the rubber latex solution, a natural rubber latex solution and a synthetic rubber latex solution are usable.

The natural rubber latex solution is a natural product based on a metabolic effect of plants, and is preferably a natural-rubber/water based latex solution in which a dispersing solvent is, particularly, water. The number-average molecular weight of the natural rubber in the natural rubber latex is preferably 2000000 or more, more preferably 2500000 or more. About the natural rubber latex solution, concentrated latex, and fresh latex called field latex can be used without being distinguished from each other. The synthetic rubber latex solution is, for example, a latex solution in which a synthetic diene rubber is produced by emulsion polymerization, examples of this rubber including isoprene rubber (IR), styrene-butadiene rubber (SBR), butadiene rubber (BR), nitrile rubber (NBR), and chloroprene rubber (CR). Such rubber latex solutions may be used singly or in any combination of two or more thereof.

The slurry containing the carbon black (A) is a slurry in which the carbon black (A) is dispersed in a dispersing solvent.

The carbon black (A) is any carbon black used in an ordinary rubber industry, such as SAF, ISAF, HAF, FEF, or GPF. The carbon black may be an electroconductive carbon black such as acetylene black or Ketchen black. The carbon black (A) may be any granulated carbon black, which has been granulated, considering the handleability of the carbon black in an ordinary rubber industry; or any non-granulated carbon black. Such carbon blacks (A) may be used singly or in any combination of two or more thereof.

The carbon black (A) preferably has a DBP absorption amount (dibutyl phthalate absorption amount) of 100 to 150 $cm^3/100$-g, and an iodine adsorption amount of 110 to 160 mg/g. About the carbon black (A), the DBP absorption amount is more preferably from 110 to 140 $cm^3/100$-g, and the iodine adsorption amount is preferably from 120 to 150 mg/g from the viewpoint of an excellent abrasion resistance of the resultant vulcanized rubber.

The dispersing solvent is in particular preferably water, and may be, for example, water containing an organic solvent. Such dispersing solvents may be used singly or in any combination of two or more thereof.

The concentration of the carbon black (A) in the slurry containing the carbon black (A) is not particularly limited, and may be, for example, from 1 to 20% by weight, or from 3 to 10% by weight.

Besides the rubber latex solution and the slurry containing the carbon black (A), blending agents used ordinarily in the rubber industry may be blended into the wet rubber masterbatch if desired, examples of these agents including a surfactant, zinc oxide, stearic acid, an antiaging agent, softeners such as wax and oil, and a working aid.

<Rubber>

The above-mentioned rubber is a component used separately from the rubber component originating from the wet rubber masterbatch. Examples of the rubber include natural rubber (NR); and synthetic diene rubbers such as isoprene rubber (IR), styrene-butadiene rubber (SBR), butadiene rubber (BR), chloroprene rubber (CR), and nitrile rubber (NBR). Such rubbers may be used singly or in any combination of two or more thereof.

About the rubber composition of the present invention, rubber components (the rubber component originating from the rubber latex solution, and the above-mentioned rubber) in this rubber composition are preferably blend rubber components of a natural rubber and a synthetic diene rubber. It is particularly preferred from the viewpoint of making the low exothermicity and abrasion resistance of the vulcanized rubber excellent that the rubber component originating from the rubber latex solution is a natural rubber, and the rubber is a synthetic diene rubber. The synthetic diene rubber is preferably styrene-butadiene rubber (SBR) or butadiene rubber (BR).

<Carbon Black (B)>

The carbon black (B) may be the same as or similar to the carbon black (A). Such carbon blacks (B) may be used singly or in any combination of two or more thereof. The carbon black (B) may be the same as or different from the carbon black (A) in species.

Hereinafter, a description will be made about the blend amount of each of the components of the rubber composition of the present invention.

About the wet rubber masterbatch, the amount of the carbon black (A) in this wet rubber masterbatch is from 1 to 35 by weight for 100 parts by weight of the rubber component in the wet rubber masterbatch. The amount of the carbon black (A) in the wet rubber masterbatch is from 3 to 30 parts by weight for 100 parts by weight of the rubber component in the wet rubber masterbatch from the viewpoint of making the low exothermicity and abrasion resistance of the vulcanized rubber excellent.

About the rubber composition, the amount of the total of the carbon blacks (A) and (B) in this rubber composition is 50 parts or more by weight for 100 parts by weight of all rubber components in the rubber composition. From the viewpoint of making the low exothermicity and abrasion resistance of the vulcanized rubber excellent, the amount of the total of the carbon blacks (A) and (B) in the rubber composition is preferably 55 parts or more by weight for 100 parts by weight of all the rubber components in the rubber composition, and is preferably 100 parts or less by weight, more preferably 80 parts or less by weight therefor.

In the rubber composition, the content by proportion of the carbon black (A) is preferably from 1 to 25% by weight, more preferably from 3 to 20% by weight of the total of the carbon blacks (A) and (B) contained in the rubber composition from the viewpoint of heightening the abrasion resistance of the vulcanized rubber.

When the rubber components in the rubber composition are blend components of a natural rubber and a synthetic diene rubber, the proportion of the natural rubber in the blend rubber components is preferably from 20 to 50% by weight, more preferably from 30 to 45% by weight.

<Various Blending Agents>

In the rubber composition, various blending agents are further usable. The usable blending agents are blending agents used ordinarily in the rubber industry. Examples thereof include sulfur-based vulcanizers, vulcanization promoters, antiaging agents, silica, silane coupling agents, zinc oxide, methylene acceptors and methylene donors, stearic acid, vulcanization promotion aids, vulcanization retarders, organic peroxides, softeners such as wax and oil, and working aids.

The species of sulfur for the sulfur-based vulcanizers may be any ordinary sulfur species for rubbers. Examples of the species include powdery sulfur, precipitated sulfur, insoluble sulfur, and highly dispersed sulfur. The sulfur-based vulcanizers may be used singly or in any combination of two or more thereof.

The content of the sulfur species is preferably from 0.3 to 6.5 parts by weight for 100 parts by weight of the rubber components contained in the rubber composition. If the content of the sulfur species is less than 0.3 parts by weight, the vulcanized rubber is short in crosslinkage density to be lowered in strength and others. If the content is more than 6.5 parts by weight, the vulcanized rubber is deteriorated, in particular, in both of heat resistance and endurance. The content of the sulfur species is more preferably from 1.0 to 5.5 parts by weight for 100 parts by weight of the rubber components contained in the rubber composition to cause the vulcanized rubber to keep a good rubber strength and be further improved in heat resistance and endurance.

The vulcanization promoters may each be any ordinary vulcanization promoter for rubbers. Examples thereof include sulfenamide based, thiuram based, thiazole based, thiourea based, guanidine based and dithiocarbamic acid salt based vulcanization promoters. The vulcanization promoters may be used singly or in any combination of two or more thereof.

The content of the vulcanization promoter(s) is preferably from 1 to 5 parts by weight for 100 parts by weight of the rubber components contained in the rubber composition.

The antiaging agents may each be any ordinary antiaging agent for rubbers. Examples thereof include aromatic amine based, amine-ketone based, monophenol based, bisphenol based, polyphenol based, dithiocarbamic acid salt based, and thiourea based antiaging agents. The antiaging agents may be used singly or in any combination of two or more thereof.

The content of the antiaging agent(s) is preferably from 1 to 5 parts by weight for 100 parts by weight of the rubber components contained in the rubber composition.

<Method for Producing Rubber Composition>

Hereinafter, a description will be made about the method of the present invention for producing a rubber composition. This producing method includes a step (i) of mixing the above-defined rubber latex solution with the above-defined slurry solution containing the carbon black (A) to produce a rubber latex solution containing the carbon black; a step (ii) of solidifying and drying the resultant rubber latex solution containing the carbon black (A) to produce a wet rubber masterbatch; and a step (iii) of adding the above-defined rubber and the carbon black (B) further into the resultant wet rubber masterbatch, and dry-mixing these components with each other.

<Step (i)>

The step (i) in the present invention includes an operation of mixing the rubber latex solution with the slurry solution containing the carbon black (A) to produce a rubber latex solution containing the carbon black (A).

The slurry containing the carbon black (A) is a slurry in which the carbon black (A) is dispersed in the above-defined dispersing solvent. In the present invention, the step (i) in particular preferably includes a step (i-(a)) of adding, at the time of dispersing the carbon black (A) into the dispersing solvent, at least one portion of the rubber latex solution into the dispersing solvent to produce a slurry solution containing the carbon black (A) to which rubber latex particles adhere; and a step (i-(b)) of mixing the resultant slurry solution, which contains the carbon black (A) to which the rubber latex particles adhere, with the rest of the rubber latex solution to produce a rubber latex solution containing the carbon black (A) to which the rubber latex particles adhere. Hereinafter, a description will be made about the step (i-(a)) and the step (i-(b)).

<Step (i-(a))>

In the step (i-(a)) in the present invention, at the time of dispersing the carbon black (A) into the dispersing solvent, at least one portion of the rubber latex solution is added to the dispersing solvent to produce a slurry solution containing the carbon black (A) to which rubber latex particles adhere. It is allowable to mix the rubber latex solution beforehand with the dispersing solvent, and then add the carbon black (A) to the mixture to disperse the carbon black in the mixture. It is also allowable to: add the carbon black (A) to the dispersing solvent; and next add the rubber latex solution thereto at a predetermined adding-speed and simultaneously disperse the carbon black (A) in the dispersing solvent. Alternatively, it is allowable to: add the carbon black (A) to the dispersing solvent; and next add thereto a predetermined volume of the rubber latex solution several times through operations separated from each other and simultaneously disperse the carbon black (A) in the dispersing solvent. By dispersing the carbon black (A) into the dispersing solvent in the presence of the rubber latex solution, the slurry solution can be produced, which contains the carbon black (A) to which the rubber latex particles adhere. The addition amount of the rubber latex solution in the step (i-(a)) is, for example, from 0.075 to 12% by weight of the whole amount of the rubber latex solution to be used (the whole amount of fractions of this latex solution that are to be added in the step (i-(a)) and in the step (i-(b)).

In the step (i-(a)), the proportion of the rubber component in the rubber latex solution to be added is preferably from 0.25 to 15%, more preferably from 0.5 to 6% by weight of the carbon black (A). The concentration of the rubber component in the rubber latex solution to be added is preferably from 0.2 to 5% by weight, more preferably from 0.25 to 1.5% by weight. In these cases, a wet rubber masterbatch can be produced in which the dispersion degree of the carbon black (A) is heightened while the rubber latex particles are surely caused to adhere to the carbon black (A).

In the step (i-(a)), the method for mixing the carbon black (A) and the dispersing solvent with each other in the presence of the rubber latex solution is, for example, a method of dispersing the carbon black, using an ordinary dispersing machine such as a highly shearing mixer, a High Shear Mixer, a homo-mixer, a ball mill, a bead mill, a high-pressure homogenizer, an ultrasonic homogenizer or a colloid mill.

The "highly shearing mixer" means a mixer having a high-speed-rotatable rotor and a fixed stator in which in the state of setting a precise clearance between the rotor and the stator, the rotor is rotated so that a highly shearing effect acts. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product. An example thereof is a mixer, "High Shear Mixer", manufactured by a company Silverson.

In the present invention, at the time of mixing the carbon black (A) with the dispersing solvent in the presence of the rubber latex solution to produce the slurry solution, which contains the carbon black (A) to which the rubber latex particles adhere, a surfactant may be added thereto in order to improve the carbon black (A) in dispersibility. The surfactant may be a surfactant known in the rubber industry. Examples thereof include nonionic surfactants, anionic surfactants, cationic surfactants, and amphoteric surfactants. Instead of the surfactant or in addition of the surfactant, an alcohol such as ethanol may be used. However, when the surfactant is used, it is feared that the finally obtained vulcanized rubber is lowered in rubber physical properties. Thus, the blend amount of the surfactant is preferably 2 parts or less by weight, more preferably 1 part or less by weight for 100 parts by weight of the rubber component in the rubber latex solution. It is preferred not to use any surfactant substantially.

<Step (i-(b))>

In the step (i-(b)), the slurry solution, which contains the carbon black (A) to which the rubber latex particles adhere, is mixed with the rest of the rubber latex solution to produce a rubber latex solution containing the carbon black (A) to which the rubber latex particles adhere. The method for mixing the slurry solution, which contains the carbon black (A) to which the rubber latex particles adhere, with the rest of the rubber latex solution in a liquid phase is not particularly limited, and may be a method of mixing the slurry solution, which contains the carbon black (A) to which the rubber latex particles adhere, with the rest of the rubber latex solution, using an ordinary dispersing machine such as a highly shearing mixer, a High Shear Mixer, a homo-mixer, a ball mill, a bead mill, a high-pressure homogenizer, an ultrasonic homogenizer or a colloid mill. At the time of the mixing, the whole of the mixing system, for example, the dispersing machine may be optionally heated.

In the case of considering the drying period and labor in the next step (ii), the rubber component concentration in the rest of the rubber latex solution is preferably higher than that in the rubber latex solution added in the step (i-(a)). Specifically, the former rubber component concentration is preferably from 10 to 60% by weight, more preferably from 20 to 30% by weight.

<(2) Step (ii)>

The step (ii) in the present invention includes an operation of solidifying and drying the resultant rubber latex solution containing the carbon black (A) to produce a wet rubber masterbatch.

The method for the solidification is, for example, a method of incorporating a solidifier into the rubber latex solution containing the carbon black (A) to yield a rubber solidified product containing the carbon black (A). In this case, usable examples of the solidifier include acids such as formic acid and sulfuric acid, and salts such as sodium chloride, these acids or salts being ones usually used to solidify a rubber latex solution.

The method for the drying may be a method using a drying machine that may be of various types, such as a uniaxial extruder, an oven, a vacuum drier, or an air drier.

Before or after the solidifying step, in order to decrease, into an appropriate degree, the amount of water which the rubber solidified product containing the carbon black (A) contains, a solid-liquid separating step, such as a centrifugal step or heating step, may be set as the need arises. In the solid-liquid separating step, it is allowable as the need arises to incorporate a coagulant into the rubber latex solution containing the carbon black (A), and then colleting and drying the resultant coagulated product. It is possible to use, as the coagulant, a substance known as a coagulant for rubber latex solutions without any limitation. Specific examples thereof include cationic coagulants.

<(3) Step (iii)>

The step (iii) in the present invention includes an operation of adding the above-defined rubber and the carbon black (B) further into the wet rubber masterbatch, and dry-mixing these components with each other. Furthermore, in the dry mixing, the same blending agents as described above may be blended into the composition as the need arises.

In the step (iii), the method for blending the individual raw materials (individual components) thereinto is not particularly limited. The method is, for example, a method of adding components other than vulcanization-related components, such any sulfur-based vulcanizer and any vulcanization promoter, in any order to a kneading system, and then kneading the components; a method of adding these components simultaneously thereinto, and then kneading the components; or a method of adding all components simultaneously thereinto, and then kneading these components.

The method for the dry mixing is, for example, a method of kneading the components, using a kneading machine used in an ordinary rubber industry, such as a Banbury mixer, a kneader, or a roll. The number of times of the kneading may be one or plural. The period for the kneading is varied in accordance with the size of a kneading machine to be used, and other factors. It is advisable to set the period usually into the range of about 2 to 5 minutes. When the rubber composition includes no vulcanization-related components, the discharging-temperature of the composition in the kneading machine is set to a range preferably from 120 to 170° C., more preferably from 120 to 150° C. When the rubber composition includes one or more of the vulcanization-related components, the discharging-temperature in the kneading machine is set to a range preferably from 80 to 110° C., more preferably from 80 to 100° C.

A vulcanized rubber yielded from the rubber composition of the present invention has a low in exothermicity and has abrasion resistance to be suitable for tread rubbers of tires for light trucks.

EXAMPLES

Hereinafter, the present invention will be described by way of working examples thereof. However, the invention is never limited by these working examples.

(Used Raw Materials)

a) Carbon blacks (CB):
Carbon black 1 (CB1): "SEAST 9H (SAF-HS)" (DBP absorption amount: 130 cm$^3$/100-g), and iodine adsorption amount: 139 mg/g) (manufactured by Tokai Carbon Co., Ltd.), and
Carbon black 2 (CB2): "SEAST 7HM (N234)" (DBP absorption amount: 125 cm$^3$/100-g), and iodine adsorption amount: 120 mg/g) (manufactured by Tokai Carbon Co., Ltd.);

b) Dispersing solvent: Water;

c) Rubber latex solution:
Natural rubber latex solution "NR field latex"(manufactured by a company Golden Hope) (DRC=31.2%);

d) Solidifier: Formic acid (solution obtained by diluting a first-class 85% solution thereof into a 10% solution, and adjusting the pH of the diluted solution to 1.2) (manufactured by Nacalai Tesque, Inc.);

e) Oil: "PROCESS NC140", manufactured by Japan Energy Corp.;

f) Zinc oxide: "Zinc Flower No. 1" (manufactured by Mitsui Mining & Smelting Co., Ltd.);

g) Antiaging agent: N-(1,3-dimethylbutyl)-N'-phenyl-p-phenylenediamine "NOCRAC 6C" (manufactured by Ouchi Shinko Chemical Industrial Co., Ltd.);

h) Stearic acid: "RUNACK S-20" (manufactured by Kao Corp.);

i) Wax: "OZOACE 0355" (manufactured by Nippon Seiro Co., Ltd.);

j) Sulfur: "5%-OIL-INCORPORATED FINELY-POWDERY SULFUR" (manufactured by Tsurumi Chemical Industry Co., Ltd.);

k) Vulcanization promoter: "SOXINOL CZ" (manufactured by Sumitomo Chemical Co., Ltd.);

l) Natural rubber (NR): "RSS #3";

m) Styrene-butadiene rubber (SBR): "SBR 1502" (manufactured by JSR Corp.); and n) Butadiene rubber (BR): "BR 150B" (manufactured by Ube Industries, Ltd.).

Example 1

<Production of Wet Rubber Masterbatch (WMB)>

Into a dilute natural rubber latex solution having an adjusted concentration of 0.5% by weight was added the carbon black to give a blend amount shown in Table 1 (the proportion by weight of the rubber component in the latex solution was 1% by weight of the carbon black). A device ROBOMIX manufactured by PRIMIX Corp. was used (ROBOMIX conditions: 9000 rpm for 30 minutes) to disperse the carbon black into this liquid phase to produce a slurry solution containing the carbon black to which the natural rubber latex particles adhere (step (i-(a))). Next, to the resultant slurry solution containing the carbon black to which the natural rubber latex particles adhere, was added the rest of the natural rubber concentrated latex solution (adjusted to have a solid (rubber) concentration of 25% by weight by the addition of water) to set the rubber component amount in a combination of this rest of the rubber latex solution with the natural rubber latex solution used in the step (i)-(a) into 100 parts by weight. Thereafter, a mixer for home use, SM-L56 model, manufactured by SANYO Electric Co., Ltd. was used to mix the individual components with each other (mixer conditions: 11300 rpm for 30 minutes) to produce a natural rubber latex solution containing the carbon black to which the natural rubber latex particles adhere (step (i)-(b)).

To the resultant natural rubber latex solution containing the carbon black to which the natural rubber latex particles adhere, was added a 10% by weight solution of formic acid in water, as a solidifier, until the pH of the latex solution turned to 4. The resultant was heated to 60° C. In this state, the natural rubber latex solution containing the carbon black to which the natural rubber latex particles adhere was solidified to yield a solidified product. In the state that the solidified product was heated to 60° C., the solidified product was separated from the solution (by filtrating separation through a punching metal, manufactured by SUS Corp., of 2.0 diameter and 3.5 P), and a squeezer-type uniaxial extruding-dehydrator (V-02 model) manufactured by SUEHIRO EPM Corp. was used to dry the solidified product to produce a wet natural rubber masterbatch (WMB (4)) (step (ii)).

<Production of Rubber Composition>

A Banbury mixer was used to dry-mix the wet rubber masterbatch (WMB (4)) yielded as described above with individual materials (i.e., components other sulfur and any vulcanization promoter) shown in Table 2 (kneading period: 3 minutes; composition-discharging-temperature: 150° C.). In this way, a rubber composition was produced. Next, to the resultant rubber composition were added sulfur and a vulcanization promoter that are shown in Table 2, and then the Banbury mixer was used to dry-mix all the components (kneading period: 1 minute; composition-discharging-temperature: 90° C.). In this way, an unvulcanized rubber composition was produced (step (iii)). The blend proportion of any component in Table 2 is represented by the numerical value (phr) of the part(s) by weight of this component when the whole amount of the rubber components contained in the corresponding rubber composition is regarded as 100 parts by weight.

Examples 2 to 30

In each of the examples, a wet rubber composition and an unvulcanized rubber composition were produced in the same way as in Example 1 except that the respective species of the individual raw materials and the respective blend amounts thereof were changed as shown in one of Tables 1 to 4.

Comparative Examples 1 and 2, 11 and 12, and 21 and 22

In each of the examples, a Banbury mixer was used to dry-mix individual raw materials (i.e., components other than sulfur and any vulcanization promoter) shown in one of Tables 2 to 4 (kneading period: 3 minutes; composition-discharging-temperature: 150° C.). In this way, a rubber composition was produced. Next, to the resultant rubber composition were added sulfur and a vulcanization promoter that are shown in one of Tables 2 to 4, and then the Banbury mixer was used to dry-mix all the components (kneading period: 1 minute; composition-discharging-temperature: 90° C.). In this way, an unvulcanized rubber composition was produced.

Comparative Examples 3 to 10, 13 to 20, and 23 to 30

In each of the examples, a wet rubber composition and an unvulcanized rubber composition were produced in the same way as in Example 1 except that the respective species of the individual raw materials and the respective blend amounts thereof were changed as shown in one of Tables 1 to 4.

The unvulcanized rubber composition yielded in each of the working examples and the comparative examples was vulcanized at 150° C. for 30 minutes to produce a vulcanized rubber. The resultant vulcanized rubber was evaluated as described below. The evaluation results are shown in Tables 2 to 4.

<Low Exothermicity Evaluation>

About the evaluation of the exothermicity of each of the examples, a viscoelasticity measuring instrument manufactured by Toyo Seiki Kogyo Co., Ltd. was used to measure the loss coefficient tan δ under conditions of a static strain of 10%, a dynamic strain of ±1%, a frequency of 10 Hz, and a temperature of 60° C. The loss coefficient in each of Examples 1 to 10 and Comparative Examples 2 to 10 was represented by an index relative to the value thereof in Comparative Example 1, this value being regarded as 100; the loss coefficient in each of 11 to 20 and Comparative Example 12 to 20, by an index relative to the value thereof in Comparative Example 11, which was regarded as 100; and the loss coefficient in each of Examples 21 to 30, and Comparative Examples 22 to 30, by an index relative to the value thereof in Comparative Example 21, which was regarded as 100. As the index of the vulcanized rubbers is smaller, the vulcanized rubbers less easily generate heat. This matter means that the vulcanized rubbers are better in low exothermicity.

<Abrasion Resistances Evaluation>

About the evaluation of the abrasion resistance, in accordance with JIS K6264, a Lambourn abrasion tester manufactured by Iwamoto Seisakusho Co., Ltd. was used to measure the abrasion loss of a test piece of the resultant vulcanized rubber in the example at a load of 40 N, a slip percentage of 30%, a temperature of 23° C., and a dropped sand amount of 20 g/minute. The inverse number of the abrasion loss in each of Examples 1 to 10 and Comparative Examples 2 to 10 was represented by an index relative to the value thereof in Comparative Example 1, this value being regarded as 100; the number in each of Examples 11 to 20, and Comparative Examples 12 to 20, by an index relative to the value thereof in Comparative Example 11, which was regarded as 100; and the number in each of Examples 21 to 30, and Comparative Examples 22 to 30, by an index relative to the value thereof in Comparative Example 21, which was regarded as 100. As the index of the vulcanized rubbers is larger, the abrasion loss thereof is smaller. This matter means that the vulcanized rubbers are better in abrasion resistance.

TABLE 1

|  |  |  | WMB(1) | WMB(2) | WMB(3) | WMB(4) | WMB(5) | WMB(6) | WMB(7) | WMB(8) |
|---|---|---|---|---|---|---|---|---|---|---|
| Wet rubber masterbatch production | Steps (i) to (ii) | NR (rubber component) | 100 | 100 | 100 | 100 | 100 | 100 | 100 | 100 |
|  |  | CB1 | 40 |  | 20 | 5 | 30 |  |  | 10 |
|  |  | CB2 |  | 40 | 20 |  |  | 5 | 30 | 100 |

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Rubber composition production | Step (iii) | WMB(1) |  |  | 56 | 56 |  |  |  |
|  |  | WMB(2) |  |  |  |  | 56 | 56 |  |
|  |  | WMB(3) |  |  |  |  |  |  | 56 |
|  |  | WMB(4) |  |  |  |  |  |  |  |
|  |  | WMB(5) |  |  |  |  |  |  |  |
|  |  | WMB(6) |  |  |  |  |  |  |  |
|  |  | WMB(7) |  |  |  |  |  |  |  |
|  |  | WMB(8) |  |  |  |  |  |  |  |
|  |  | NR | 40 | 40 |  |  |  |  |  |
|  |  | SBR | 60 | 60 | 60 | 60 | 60 | 60 | 60 |
|  |  | CB1 | 60 | 0 | 44 | 0 | 0 | 44 | 44 |
|  |  | CB2 | 0 | 60 | 0 | 44 | 44 | 0 | 0 |
|  |  | Oil | 10 | 10 | 10 | 10 | 10 | 10 | 10 |
|  |  | Zinc oxide | 3 | 3 | 3 | 3 | 3 | 3 | 3 |
|  |  | Antiaging agent | 2 | 2 | 2 | 2 | 2 | 2 | 2 |
|  |  | Stearic acid | 2 | 2 | 2 | 2 | 2 | 2 | 2 |
|  |  | Wax | 2 | 2 | 2 | 2 | 2 | 2 | 2 |
|  |  | Sulfur | 2 | 2 | 2 | 2 | 2 | 2 | 2 |
|  |  | Vulcanization promotor | 2 | 2 | 2 | 2 | 2 | 2 | 2 |
| Total CB amount for 100 parts by weight of all rubber components |  |  | 60 | 60 | 60 | 60 | 60 | 60 | 60 |
| Evaluations |  | Low exothermicity | 100 | 90 | 98 | 91 | 89 | 97 | 96 |
|  |  | Abrasion resistance | 100 | 90 | 101 | 94 | 92 | 99 | 100 |

|  |  |  | Comparative Example 8 | Comparative Example 9 | Comparative Example 10 | Example 1 | Example 2 | Example 3 | Example 4 |
|---|---|---|---|---|---|---|---|---|---|
| Rubber composition production | Step (iii) | WMB(1) |  |  |  |  |  |  |  |
|  |  | WMB(2) |  |  |  |  |  |  |  |
|  |  | WMB(3) | 56 |  |  |  |  |  |  |
|  |  | WMB(4) |  | 42 |  | 42 | 42 |  |  |
|  |  | WMB(5) |  |  | 52 |  |  | 52 | 52 |
|  |  | WMB(6) |  |  |  |  |  |  |  |
|  |  | WMB(7) |  |  |  |  |  |  |  |
|  |  | WMB(8) |  |  |  |  |  |  |  |
|  |  | NR |  |  |  |  |  |  |  |
|  |  | SBR | 60 | 60 | 60 | 60 | 60 | 60 | 60 |
|  |  | CB1 | 0 | 0 | 0 | 58 | 0 | 48 | 0 |
|  |  | CB2 | 44 | 38 | 28 | 0 | 58 | 0 | 48 |
|  |  | Oil | 10 | 10 | 10 | 10 | 10 | 10 | 10 |
|  |  | Zinc oxide | 3 | 3 | 3 | 3 | 3 | 3 | 3 |
|  |  | Antiaging agent | 2 | 2 | 2 | 2 | 2 | 2 | 2 |
|  |  | Stearic acid | 2 | 2 | 2 | 2 | 2 | 2 | 2 |
|  |  | Wax | 2 | 2 | 2 | 2 | 2 | 2 | 2 |
|  |  | Sulfur | 2 | 2 | 2 | 2 | 2 | 2 | 2 |
|  |  | Vulcanization promotor | 2 | 2 | 2 | 2 | 2 | 2 | 2 |

TABLE 2-continued

| | | | | | | | | |
|---|---|---|---|---|---|---|---|---|
| Total CB amount for 100 parts by weight of all rubber components | | 60 | 40 | 40 | 60 | 60 | 60 | 60 |
| Evaluations | Low exothermicity | 90 | 88 | 90 | 94 | 85 | 93 | 86 |
| | Abrasion resistance | 93 | 85 | 86 | 105 | 98 | 109 | 100 |

| | | | | Example 5 | Example 6 | Example 7 | Example 8 | Example 9 | Example 10 |
|---|---|---|---|---|---|---|---|---|---|
| Rubber composition production | Step (iii) | | WMB(1) | | | | | | |
| | | | WMB(2) | | | | | | |
| | | | WMB(3) | | | | | | |
| | | | WMB(4) | | | | | | |
| | | | WMB(5) | | | | | | |
| | | | WMB(6) | 42 | 42 | | | | |
| | | | WMB(7) | | | 52 | 52 | | |
| | | | WMB(8) | | | | | 48 | 48 |
| | | | NR | | | | | | |
| | | | SBR | 60 | 60 | 60 | 60 | 60 | 60 |
| | | | CB1 | 58 | 0 | 48 | 0 | 52 | 0 |
| | | | CB2 | 0 | 58 | 0 | 48 | 0 | 52 |
| | | | Oil | 10 | 10 | 10 | 10 | 10 | 10 |
| | | | Zinc oxide | 3 | 3 | 3 | 3 | 3 | 3 |
| | | | Antiaging agent | 2 | 2 | 2 | 2 | 2 | 2 |
| | | | Stearic acid | 2 | 2 | 2 | 2 | 2 | 2 |
| | | | Wax | 2 | 2 | 2 | 2 | 2 | 2 |
| | | | Sulfur | 2 | 2 | 2 | 2 | 2 | 2 |
| | | | Vulcanization promotor | 2 | 2 | 2 | 2 | 2 | 2 |
| Total CB amount for 100 parts by weight of all rubber components | | | | 60 | 60 | 60 | 60 | 60 | 60 |
| Evaluations | | | Low exothermicity | 95 | 85 | 93 | 84 | 95 | 85 |
| | | | Abrasion resistance | 105 | 96 | 105 | 98 | 105 | 99 |

TABLE 3

| | | | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|
| Rubber composition production | Step (iii) | WMB(1) | | | 56 | 56 | | | |
| | | WMB(2) | | | | | 56 | 56 | |
| | | WMB(3) | | | | | | | 56 |
| | | WMB(4) | | | | | | | |
| | | WMB(5) | | | | | | | |
| | | WMB(6) | | | | | | | |
| | | WMB(7) | | | | | | | |
| | | WMB(8) | | | | | | | |
| | | NR | 40 | 40 | | | | | |
| | | BR | 60 | 60 | 60 | 60 | 60 | 60 | 60 |
| | | CB(A) | 60 | 0 | 44 | 0 | 0 | 44 | 44 |
| | | CB(B) | 0 | 60 | 0 | 44 | 44 | 0 | 0 |
| | | Oil | 10 | 10 | 10 | 10 | 10 | 10 | 10 |
| | | Zinc oxide | 3 | 3 | 3 | 3 | 3 | 3 | 3 |
| | | Antiaging agent | 2 | 2 | 2 | 2 | 2 | 2 | 2 |
| | | Stearic acid | 2 | 2 | 2 | 2 | 2 | 2 | 2 |
| | | Wax | 2 | 2 | 2 | 2 | 2 | 2 | 2 |
| | | Sulfur | 2 | 2 | 2 | 2 | 2 | 2 | 2 |
| | | Vulcanization promotor | 2 | 2 | 2 | 2 | 2 | 2 | 2 |
| Total CB amount for 100 parts by weight of all rubber components | | | 60 | 60 | 60 | 60 | 60 | 60 | 60 |
| Evaluations | | Low exothermicity | 100 | 90 | 97 | 88 | 86 | 92 | 92 |
| | | Abrasion resistance | 100 | 90 | 103 | 95 | 96 | 104 | 105 |

TABLE 3-continued

| | | | Comparative Example 18 | Comparative Example 19 | Comparative Example 20 | Example 11 | Example 12 | Example 13 | Example 14 |
|---|---|---|---|---|---|---|---|---|---|
| Rubber composition production | Step (iii) | WMB(1) | | | | | | | |
| | | WMB(2) | | | | | | | |
| | | WMB(3) | 56 | | | | | | |
| | | WMB(4) | | 42 | | 42 | 42 | | |
| | | WMB(5) | | | 52 | | | 52 | 52 |
| | | WMB(6) | | | | | | | |
| | | WMB(7) | | | | | | | |
| | | WMB(8) | | | | | | | |
| | | NR | | | | | | | |
| | | BR | 60 | 60 | 60 | 60 | 60 | 60 | 60 |
| | | CB(A) | 0 | 0 | 0 | 58 | 0 | 48 | 0 |
| | | CB(B) | 44 | 38 | 28 | 0 | 58 | 0 | 48 |
| | | Oil | 10 | 10 | 10 | 10 | 10 | 10 | 10 |
| | | Zinc oxide | 3 | 3 | 3 | 3 | 3 | 3 | 3 |
| | | Antiaging agent | 2 | 2 | 2 | 2 | 2 | 2 | 2 |
| | | Stearic acid | 2 | 2 | 2 | 2 | 2 | 2 | 2 |
| | | Wax | 2 | 2 | 2 | 2 | 2 | 2 | 2 |
| | | Sulfur | 2 | 2 | 2 | 2 | 2 | 2 | 2 |
| | | Vulcanization promotor | 2 | 2 | 2 | 2 | 2 | 2 | 2 |
| Total CB amount for 100 parts by weight of all rubber components | | | 60 | 40 | 40 | 60 | 60 | 60 | 60 |
| Evaluations | | Low exothermicity | 87 | 84 | 86 | 88 | 79 | 86 | 80 |
| | | Abrasion resistance | 97 | 90 | 92 | 112 | 104 | 116 | 108 |

| | | | Example 15 | Example 16 | Example 17 | Example 18 | Example 19 | Example 20 |
|---|---|---|---|---|---|---|---|---|
| Rubber composition production | Step (iii) | WMB(1) | | | | | | |
| | | WMB(2) | | | | | | |
| | | WMB(3) | | | | | | |
| | | WMB(4) | | | | | | |
| | | WMB(5) | | | | | | |
| | | WMB(6) | 42 | 42 | | | | |
| | | WMB(7) | | | 52 | 52 | | |
| | | WMB(8) | | | | | 48 | 48 |
| | | NR | | | | | | |
| | | BR | 60 | 60 | 60 | 60 | 60 | 60 |
| | | CB(A) | 58 | 0 | 48 | 0 | 52 | 0 |
| | | CB(B) | 0 | 58 | 0 | 48 | 0 | 52 |
| | | Oil | 10 | 10 | 10 | 10 | 10 | 10 |
| | | Zinc oxide | 3 | 3 | 3 | 3 | 3 | 3 |
| | | Antiaging agent | 2 | 2 | 2 | 2 | 2 | 2 |
| | | Stearic acid | 2 | 2 | 2 | 2 | 2 | 2 |
| | | Wax | 2 | 2 | 2 | 2 | 2 | 2 |
| | | Sulfur | 2 | 2 | 2 | 2 | 2 | 2 |
| | | Vulcanization promotor | 2 | 2 | 2 | 2 | 2 | 2 |
| Total CB amount for 100 parts by weight of all rubber components | | | 60 | 60 | 60 | 60 | 60 | 60 |
| Evaluations | | Low exothermicity | 88 | 75 | 85 | 78 | 88 | 78 |
| | | Abrasion resistance | 112 | 113 | 113 | 106 | 113 | 106 |

TABLE 4

| | | | Comparative Example 21 | Comparative Example 22 | Comparative Example 23 | Comparative Example 24 | Comparative Example 25 | Comparative Example 26 | Comparative Example 27 |
|---|---|---|---|---|---|---|---|---|---|
| Rubber composition production | Step (iii) | WMB(1) | | | 56 | 56 | | | |
| | | WMB(2) | | | | | 56 | 56 | |
| | | WMB(3) | | | | | | | 56 |
| | | WMB(4) | | | | | | | |
| | | WMB(5) | | | | | | | |

TABLE 4-continued

|  |  |  |  |  |  |  |  |  |
|---|---|---|---|---|---|---|---|---|
|  | WMB(6) |  |  |  |  |  |  |  |
|  | WMB(7) |  |  |  |  |  |  |  |
|  | WMB(8) |  |  |  |  |  |  |  |
|  | NR | 40 | 40 |  |  |  |  |  |
|  | SBR | 30 | 30 | 30 | 30 | 30 | 30 | 30 |
|  | BR | 30 | 30 | 30 | 30 | 30 | 30 | 30 |
|  | CB(A) | 60 | 0 | 44 | 0 | 0 | 44 | 44 |
|  | CB(B) | 0 | 60 | 0 | 44 | 44 | 0 | 0 |
|  | Oil | 10 | 10 | 10 | 10 | 10 | 10 | 10 |
|  | Zinc oxide | 3 | 3 | 3 | 3 | 3 | 3 | 3 |
|  | Antiaging agent | 2 | 2 | 2 | 2 | 2 | 2 | 2 |
|  | Stearic acid | 2 | 2 | 2 | 2 | 2 | 2 | 2 |
|  | Wax | 2 | 2 | 2 | 2 | 2 | 2 | 2 |
|  | Sulfur | 2 | 2 | 2 | 2 | 2 | 2 | 2 |
|  | Vulcanization promotor | 2 | 2 | 2 | 2 | 2 | 2 | 2 |
| Total CB amount for 100 parts by weight of all rubber components |  | 60 | 60 | 60 | 60 | 60 | 60 | 60 |
| Evaluations | Low exothermicity | 100 | 90 | 98 | 90 | 90 | 95 | 94 |
|  | Abrasion resistance | 100 | 90 | 102 | 94 | 94 | 101 | 103 |

|  |  |  | Comparative Example 28 | Comparative Example 29 | Comparative Example 30 | Example 21 | Example 22 | Example 23 | Example 24 |
|---|---|---|---|---|---|---|---|---|---|
| Rubber composition production | Step (iii) | WMB(1) |  |  |  |  |  |  |  |
|  |  | WMB(2) |  |  |  |  |  |  |  |
|  |  | WMB(3) | 56 |  |  |  |  |  |  |
|  |  | WMB(4) |  | 42 |  | 42 | 42 |  |  |
|  |  | WMB(5) |  |  | 52 |  |  | 52 | 52 |
|  |  | WMB(6) |  |  |  |  |  |  |  |
|  |  | WMB(7) |  |  |  |  |  |  |  |
|  |  | WMB(8) |  |  |  |  |  |  |  |
|  |  | NR |  |  |  |  |  |  |  |
|  |  | SBR | 30 | 30 | 30 | 30 | 30 | 30 | 30 |
|  |  | BR | 30 | 30 | 30 | 30 | 30 | 30 | 30 |
|  |  | CB(A) | 0 | 0 | 0 | 58 | 0 | 48 | 0 |
|  |  | CB(B) | 44 | 38 | 28 | 0 | 58 | 0 | 48 |
|  |  | Oil | 10 | 10 | 10 | 10 | 10 | 10 | 10 |
|  |  | Zinc oxide | 3 | 3 | 3 | 3 | 3 | 3 | 3 |
|  |  | Antiaging agent | 2 | 2 | 2 | 2 | 2 | 2 | 2 |
|  |  | Stearic acid | 2 | 2 | 2 | 2 | 2 | 2 | 2 |
|  |  | Wax | 2 | 2 | 2 | 2 | 2 | 2 | 2 |
|  |  | Sulfur | 2 | 2 | 2 | 2 | 2 | 2 | 2 |
|  |  | Vulcanization promotor | 2 | 2 | 2 | 2 | 2 | 2 | 2 |
| Total CB amount for 100 parts by weight of all rubber components |  |  | 60 | 40 | 40 | 60 | 60 | 60 | 60 |
| Evaluations |  | Low exothermicity | 89 | 85 | 89 | 92 | 83 | 90 | 84 |
|  |  | Abrasion resistance | 96 | 88 | 88 | 109 | 102 | 112 | 105 |

|  |  |  | Example 25 | Example 26 | Example 27 | Example 28 | Example 29 | Example 30 |
|---|---|---|---|---|---|---|---|---|
| Rubber composition production | Step (iii) | WMB(1) |  |  |  |  |  |  |
|  |  | WMB(2) |  |  |  |  |  |  |
|  |  | WMB(3) |  |  |  |  |  |  |
|  |  | WMB(4) |  |  |  |  |  |  |
|  |  | WMB(5) |  |  |  |  |  |  |
|  |  | WMB(6) | 42 | 42 |  |  |  |  |
|  |  | WMB(7) |  |  | 52 | 52 |  |  |
|  |  | WMB(8) |  |  |  |  | 48 | 48 |
|  |  | NR |  |  |  |  |  |  |
|  |  | SBR | 30 | 30 | 30 | 30 | 30 | 30 |
|  |  | BR | 30 | 30 | 30 | 30 | 30 | 30 |
|  |  | CB(A) | 58 | 0 | 48 | 0 | 52 | 0 |
|  |  | CB(B) | 0 | 58 | 0 | 48 | 0 | 52 |
|  |  | Oil | 10 | 10 | 10 | 10 | 10 | 10 |
|  |  | Zinc oxide | 3 | 3 | 3 | 3 | 3 | 3 |
|  |  | Antiaging agent | 2 | 2 | 2 | 2 | 2 | 2 |
|  |  | Stearic acid | 2 | 2 | 2 | 2 | 2 | 2 |
|  |  | Wax | 2 | 2 | 2 | 2 | 2 | 2 |

TABLE 4-continued

|  |  |  |  |  |  |  |  |
|---|---|---|---|---|---|---|---|
|  | Sulfur | 2 | 2 | 2 | 2 | 2 | 2 |
|  | Vulcanization promotor | 2 | 2 | 2 | 2 | 2 | 2 |
| Total CB amount for 100 parts by weight of all rubber components |  | 60 | 60 | 60 | 60 | 60 | 60 |
| Evaluations | Low exothermicity | 92 | 82 | 88 | 82 | 92 | 81 |
|  | Abrasion resistance | 109 | 100 | 108 | 103 | 110 | 103 |

The invention claimed is:

1. A rubber composition, comprising:
a wet rubber masterbatch using, as raw materials, a rubber latex solution and a slurry containing a carbon black (A); a rubber; and a carbon black (B);
an amount of the carbon black (A) in the wet rubber masterbatch being from 1 to 35 by weight for 100 parts by weight of a rubber component in the wet rubber masterbatch;
a total amount of the carbon blacks (A) and (B) in the rubber composition being 50 parts or more by weight for 100 parts by weight of all rubber components in the rubber composition, and
the content by proportion of the carbon black (A) is from 1 to 25% by weight of the total of the carbon blacks (A) and (B).

2. The rubber composition according to claim 1, wherein the carbon blacks (A) and (B) each have a DBP absorption amount of 100 to 150 cm$^3$/100-g, and an iodine adsorption amount of 110 to 160 mg/g.

3. The rubber composition according to claim 1, the rubber components in the rubber composition being blend rubber components of a natural rubber and a synthetic diene rubber.

4. A method for producing the rubber composition recited in claim 1, comprising:
a step (i) of mixing the rubber latex solution with the slurry containing the carbon black (A) to produce a rubber latex solution containing the carbon black (A);
a step (ii) of solidifying and drying the resultant rubber latex solution containing the carbon black (A) to produce a wet rubber masterbatch; and
a step (iii) of adding the rubber and the carbon black (B) further into the resultant wet rubber masterbatch, and dry-mixing these components with each other.

* * * * *